United States Patent
Lee et al.

(10) Patent No.: US 8,026,468 B2
(45) Date of Patent: Sep. 27, 2011

(54) PROJECTION DISPLAY APPARATUS COMPRISING A SPATIAL-BEAM CHANGING UNIT WHICH CHANGES SPATIAL POSITIONS OF BEAMS

(75) Inventors: Young-chol Lee, Gunpo-si (KR); Sang-hyun Sohn, Yongin-si (KR); Yong-dok Cha, Suwon-si (KR); Seok-chan Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 612 days.

(21) Appl. No.: 12/103,893

(22) Filed: Apr. 16, 2008

(65) Prior Publication Data
US 2009/0002638 A1 Jan. 1, 2009

(30) Foreign Application Priority Data

Jun. 28, 2007 (KR) .......................... 10-2007-0064414
Oct. 9, 2007 (KR) .......................... 10-2007-0101699

(51) Int. Cl.
*H01L 27/00* (2006.01)

(52) U.S. Cl. ...................................... 250/208.1; 250/216
(58) Field of Classification Search ............... 250/208.1, 250/216; 353/31, 81, 33, 84; 349/7–9, 57–62; 359/209–216
See application file for complete search history.

(56) References Cited

U.S. PATENT DOCUMENTS

| 6,739,723 B1* | 5/2004 | Haven et al. ..................... 353/20 |
| 6,827,450 B1* | 12/2004 | McGettigan et al. ............ 353/31 |
| 7,104,652 B2* | 9/2006 | Kojima ............................. 353/33 |

* cited by examiner

*Primary Examiner* — Que T Le
(74) *Attorney, Agent, or Firm* — Sughrue Mion, PLLC

(57) ABSTRACT

A projection display apparatus includes: an illumination optical unit which emits beams; an image display element which modulates the beams according to image information; a spatial-beam changing unit which changes spatial positions of the beams emitted from the illumination optical unit; and a uniform-beam distribution unit, disposed between the spatial-beam changing unit and the image display element, which uniformly distributes the beams. The spatial-beam changing unit includes a moveable prism, a movement of which changes the spatial positions of the beams emitted therefrom.

16 Claims, 18 Drawing Sheets

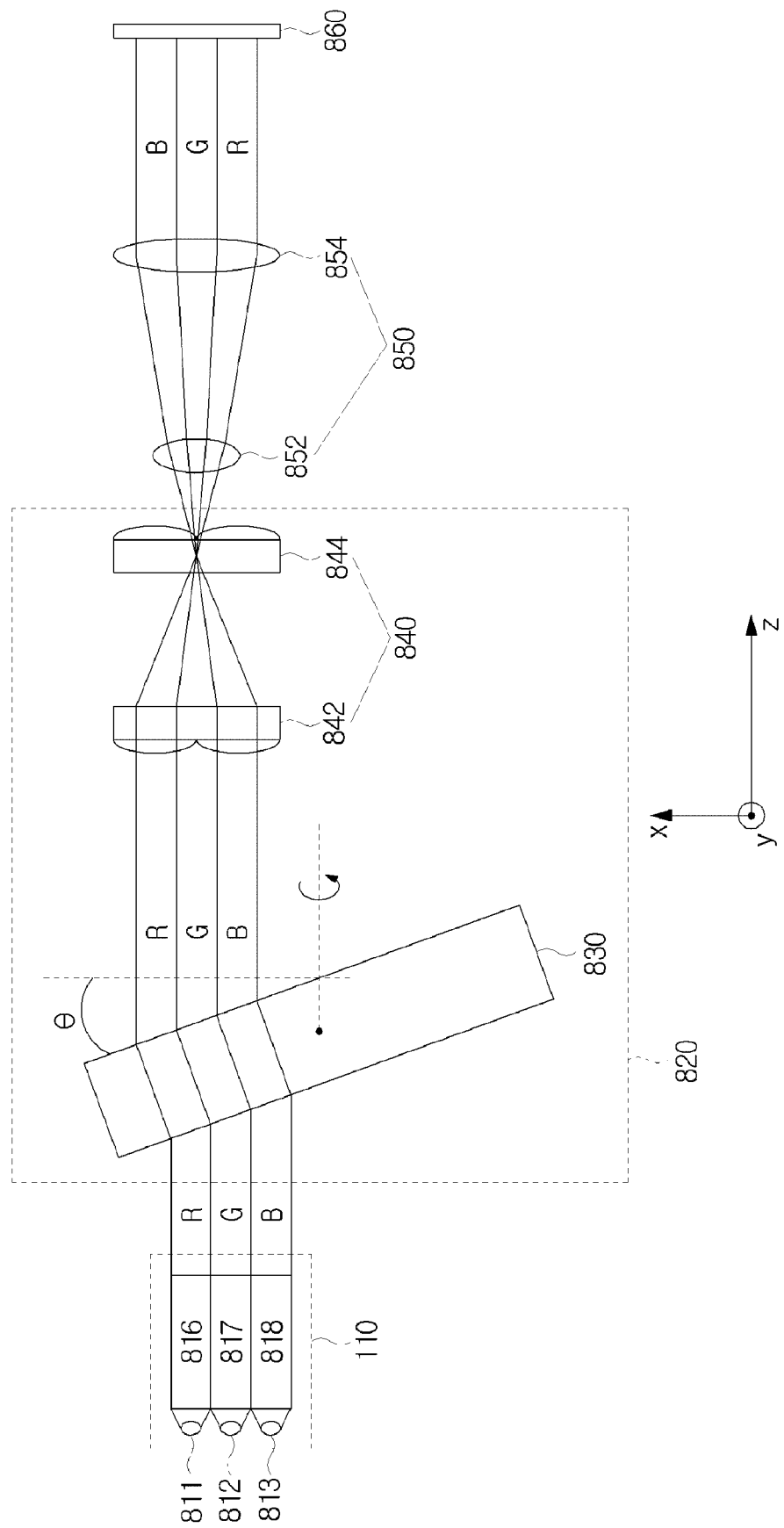

PROJECTION DISPLAY APPARATUS COMPRISING A SPATIAL-BEAM CHANGING UNIT WHICH CHANGES SPATIAL POSITIONS OF BEAMS

CROSS-REFERENCE TO RELATED APPLICATIONS

This application claims priority under 35 U.S.C. §119 from Korean Patent Application Nos. 10-2007-0064414 and 10-2007-00101699, filed on Jun. 28, 2007, and Oct. 9, 2007, respectively, in the Korean Intellectual Property Office, the disclosures of which are incorporated herein by reference in their entirety.

BACKGROUND OF THE INVENTION

1. Field of the Invention

Apparatuses and methods consistent with the present invention relate to providing a projection display apparatus an more particularly, to providing a projection display apparatus enhancing image quality.

2. Description of the Related Art

Liquid crystal displays, plasma display panels, projection display apparatuses such as projectors, and the like, are being used as apparatuses for displaying large-sized, high-quality images. Projection display apparatuses enlarge small-sized images and project the images onto large-sized screens. Recently, lamps have been used as light sources of projection display apparatuses.

However, lamps being used as light sources have short life spans and produce a lot of heat. Further, when lamps are used as light sources, the definition of a displayed image is lower, compared to when other types of light sources are used. For these reasons, efforts have been being made to develop alternative light sources capable of being used instead of lamps in projection display apparatuses and the like.

A laser beam has high directionality, making it easy to predict a change in a path of a laser beam due to reflection and/or refraction. For this reason, lasers are being used as alternative light sources for projection display apparatuses and the like. In the case of using a laser as a light source, it is possible to make a wide reproducible color range and to obtain clear images.

However, laser beams maintain the same temporal and spatial phases, resulting in the coherence of laser beams. The coherence of laser beams causes a speckle pattern to be produced on a screen. The speckle pattern appears illuminate spots on the screen. Therefore, the speckle pattern degrades the image quality, contrast, and resolution of images, and particularly of enlarged images.

A method of sequentially irradiating red, green, and blue beams to an image display element, which modulates beams corresponding to image information, has been used. However, the above-mentioned method reduces light utilization efficiency. For this reason, a method of simultaneously irradiating red, green, and blue beams to an image display elements has been developed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a projection display apparatus for enhancing light utilization efficiency while reducing speckles.

According to an aspect of the present invention, there is provided a projection display apparatus comprising: an illumination optical unit which emits beams; an image display element which modulates the beams according to image information; a spatial-beam changing unit which changes spatial positions of the beams emitted from the illumination optical unit; and a uniform-beam distribution unit, disposed between the spatial-beam changing unit and the image display element, which uniformly distributes the beams incident thereon. In this structure, the spatial-beam changing unit comprises a prism, a movement of which changes the spatial positions of the beams emitted therefrom.

The prism may rotate around an axis perpendicular to an optical axis of the beams.

The prism may have a light receiving surface and a light emitting surface parallel to each other.

The prism may swing on an axis perpendicular to an optical axis of the beams.

The uniform-beam distribution unit may be a fly-eye lens array comprising a plurality of cell lenses.

The uniform-beam distribution unit may be a light tunnel composed of a plurality of mirrors.

According to another aspect of the prevent invention, there is provided a projection display apparatus comprising: an illumination optical unit which emits a plurality of parallel beams having different colors; an image display element which modulates the plurality of beams according to image information; a spatial-beam changing unit which changes spatial positions of the plurality of beams by a movement thereof, and a relay lens unit which scrolls the plurality of beams whose spatial positions have been changed on the image display element.

The relay lens unit may scroll the beams to be irradiated onto the image display element according to the incidence positions of the beams to the relay lens unit.

While the spatial-beam changing unit moves during one period, a scrolling direction of the beams irradiated onto the image display element may be inverted at least one time.

The spatial-beam changing unit may be substantially planar and have a light receiving surface and a light emitting surface parallel to each other.

The spatial-beam changing unit may be an inclined prism inclined at a predetermined angle with respect to a plane including an optical axis of the beams.

The spatial-beam changing unit may rotate around an axis parallel to the optical axis.

The spatial-beam changing unit may rotate around an axis perpendicular to the optical axis.

The spatial-beam changing unit may swing on an axis perpendicular to the optical axis.

The relay lens unit may comprise at least one fly-eye lens.

According to a further aspect of the prevent invention, there is provided a projection display apparatus comprising: an illumination optical unit which emits a plurality of parallel beams having different colors; an image display element which modulates the plurality of beams according to image information; and a scroll optical unit, disposed between the illumination optical unit and the image display element, and which uniformly scrolls the plurality of beams emitted from the illumination optical unit.

BRIEF DESCRIPTION OF THE DRAWINGS

The above and/or other exemplary aspects and advantages of the present invention will be more apparent by the following detailed description of exemplary embodiments of the present invention with reference to the accompanying drawings, in which:

FIG. 8 is a block diagram illustrating a projection display apparatus according to a still further exemplary embodiment of the present invention.;

DETAILED DESCRIPTION OF THE EXEMPLARY EMBODIMENTS

Figure 1:
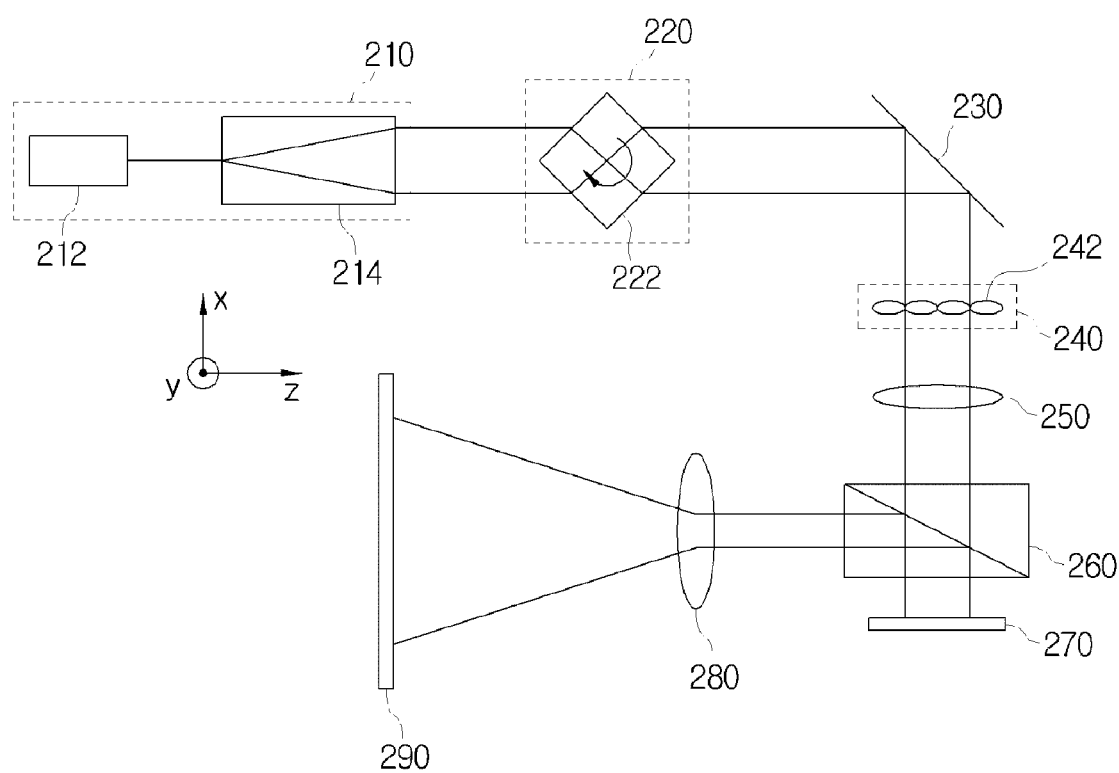
FIG. 1 is a block diagram illustrating a projection display apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Thus, it is apparent that the present invention can be carried out without those specifically defined matters. Also, well-known functions or constructions are not described in detail since they would obscure the invention with unnecessary detail.

FIG. 1 is a block diagram illustrating a projection display apparatus according to an exemplary embodiment of the present invention. As shown in FIG. 1, a projection display apparatus comprises; an illumination optical unit 210 for emitting light; a spatial-beam changing unit 220 for changing a spatial positioning of light; a mirror 230 for changing a propagation path of light; an uniform-beam distribution unit 240 for uniformizing an irradiance distribution of light; an illumination lens 250 for condensing a beam; an optical prism 260; an image display element 270 for modulating light corresponding to image information; a projection lens 280; and a screen 290. (Please note that the light as illustrated in FIG. 1 is not to scale, and is merely for general illustrative purposes.) The optical prism 260 separates light emitted from the illumination lens 250 and directed to the image display element 270 and light modulated and emitted by the image display element 270; and the projection lens 280 enlarges light emitted from the image display element 270 through the optical prism 260 and projects the light onto the screen 290.

The illumination optical unit 210 comprises a light source 212 and a beam expander 214. The light source 212 may emit a monochromatic beam having a predetermined wavelength or may emit red, green, and blue beams each having a predetermined wavelength. The beam expander 214 expands the beam or beams emitted from the light source 212 and emits a beam or beams having a predetermined shape. In the present invention, the beam expander 214 may expand a beam emitted from the light source 212 to emit a beam having a predetermined size and shape in a surface (XY surface) perpendicular to a propagation direction of the beam (Z-direction). A diffractive optical element (DOE) may be used as the beam expander 214. However, the beam expander 214 is not limited thereto. Any element capable of expanding a beam, as described, to form a beam having a predetermined size and shape can be used as the beam expander 214.

The spatial-beam changing unit 220 shifts a spatial position of a beam emitted from the beam expander 214 by dynamic movement. A rotating prism 222 rotating around an axis perpendicular to an optical axis may be used as the spatial-beam changing unit 220. The rotating prism 222 has parallel surfaces through which a beam is alternately received or emitted based on the rotation of the prism 222. The rotating prism 222 does not disperse an incident beam but rather changes a spatial position of the beam. For example, a beam entering the rotating prism 222 with an incidence angle of 90 degrees is emitted from the rotating prism 222 with an emission angle of 90 degrees, and a beam entering the rotating prism 222 with a predetermined incidence angle is emitted from the rotating prism 222 with the same emission angle as the predetermined incidence angle.

The spatial position and arrangement of beams entering the rotating prism 222 change based on the rotation of the rotating prism 222, and accordingly, the spatial position and arrangement of beams irradiated onto the image display element 270 change. As a result, an area of the image display element 270, is irradiated with beams which change based on the rotation of the prism 22, thus reducing the coherence of the light and reducing the speckle phenomenon.

The spatial-beam changing unit 220 is not limited to the rotating prism 222 but may be formed of any element capable of changing the spatial position and arrangement of beams as described herein.

The mirror 230 totally reflects light emitted from the spatial-beam changing unit 220 so as to change a propagation direction of the light. Using the mirror 230 makes it possible to reduce the volume of the projection display apparatus.

The uniform-beam distribution unit 240 makes the light reflected by the mirror 230 be uniformly distributed on the image display element 270 and may be composed of a fly-eye lens array 242. The fly-eye lens array 242 is a lens array of small cell lenses arranged two-dimensionally. Light passing through the fly-eye lens array 242 is uniformly irradiated onto the image display element 270. The fly-eye lens array also changes the position of beams irradiated onto the image display element 270 according to the positions of the beams entering the fly-eye lens array to make the distribution of the beams be uniformly distributed at the image display element 270, thereby changing the spatial position of the beams.

The illumination lens 250 (illustrated in FIG. 1 by an exemplary lens) condenses light emitted from the uniform-beam distribution unit 240 and may be composed of a number of lenses including a diverging lens, a collimating lens, and a cylindrical lens.

The optical prism 260 transmits the light emitted from the illumination lens 250 to the image display element 270 and reflects the light emitted from the image display element 270. The image display element 270 modulates the incident light from the optical prism 260 according to image information and emits the modulated light to the optical prism 260.

The projection lens 280 projects the light emitted from the image display element 270 and the optical prism 260 onto the screen 290.

The spatial positioning of light irradiated onto the image display element 270 is changed due to the dynamic driving characteristic of the spatial-beam changing unit 220 and a uniformizing characteristic of the uniform-beam distribution unit such that values of speckles decrease, whereby speckles degrading image quality on the screen 290 is reduced.

Next, a phase of light irradiated onto the image display element 270 according to whether the rotating prism 222 and/or the fly-eye lens array 242 are applied will be described.

FIGS. 2A to 4B are drawings illustrating beams of different phases irradiated onto the image display element 270 according to whether the rotating prism 222 and/or the fly-eye lens array 242 are applied. For ease of explanation, it is assumed that laser beams have spatially a first phase ①, a second phase ②, and a third phase ③. Among components shown in FIG. 1, the mirror 230 and the optical prism 260 change propagation paths of the beams and the illumination lens 250 condenses beams. However, the mirror 230, the optical prism 260, and the illumination lens 250 are irrelevant to a function of reducing speckles. For this reason, the mirror 230, the optical prism 260, and the illumination lens 250 will be omitted for ease of explanation.

Figure 2A:
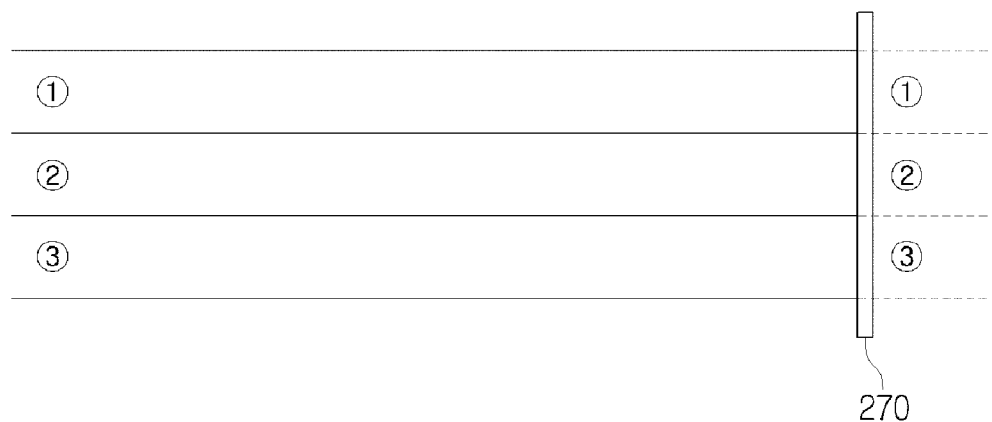
FIG. 2A is a drawing illustrating a case where beams emitted from an illumination optical unit are directly irradiated onto the image display element.

FIG. 2A is a drawing illustrating a case where beams emitted from the illumination optical unit 210 are directly irradiated onto the image display element 270. As shown in FIG. 2A, beams emitted from the illumination optical unit 210 are not temporally or spatially changed and thus the beams emitted from the illumination optical unit 210 are incident on the image display element 270 without any change in phase. In this case, a speckle phenomenon due to the use of laser beams appears at the image display element 270.

Figure 2B:
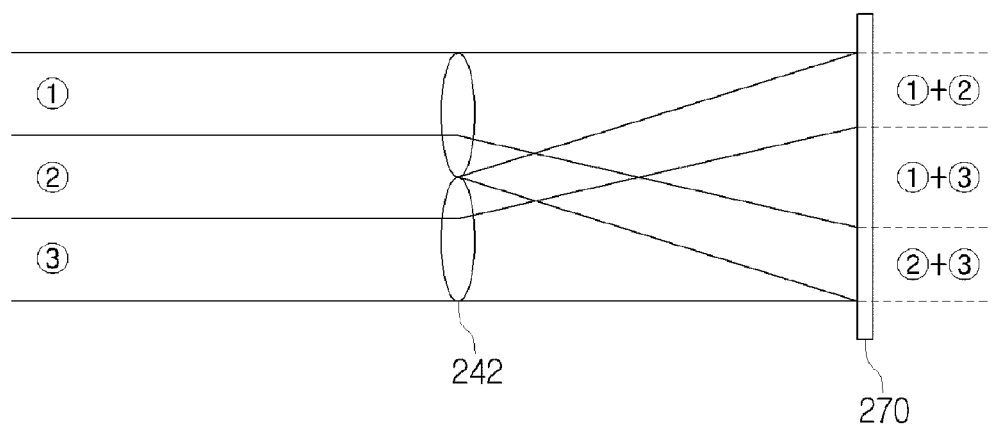
FIG. 2B is a drawing illustrating a case where beams emitted from an illumination optical unit enter the image display element through a fly-eye lens array.

FIG. 2B is a drawing illustrating a case where beams emitted from the illumination optical unit 210 enter the image display element 270 through the fly-eye lens array 242. As shown in FIG. 2B, the areas of the image display element 270 irradiated by a beam (e.g. beam ①) change according to the regions of the fly eye lens array 242 on which the beam is incident. Therefore, beams having different phases irradiated onto the same area of the image display element 270, whereby a speckle phenomenon is reduced as compared to a case where beams do not pass through the fly-eye lens array 242. However, the phases of the beams do not temporally change. For this reason, the speckle phenomenon is insignificantly reduced.

Figure 3A:
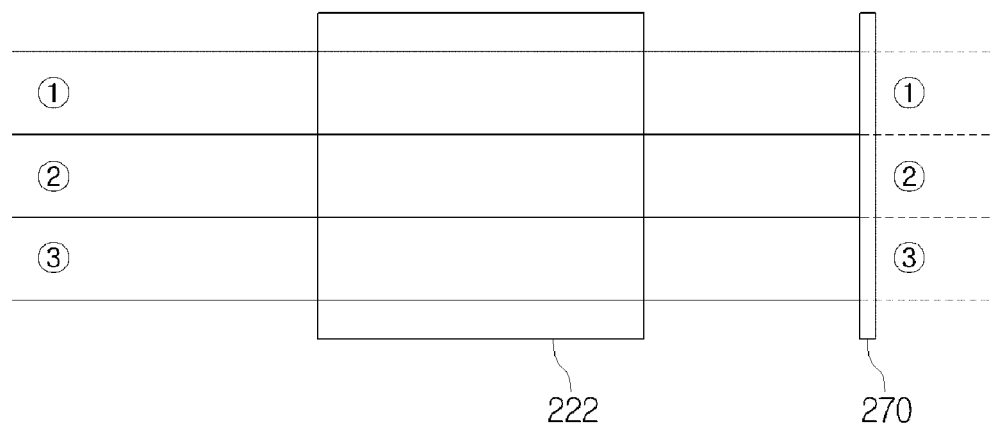
FIGS. 3A and 3B are drawings a case where beams emitted from an illumination optical unit enter the image display element through a rotating prism.
Figure 3B:
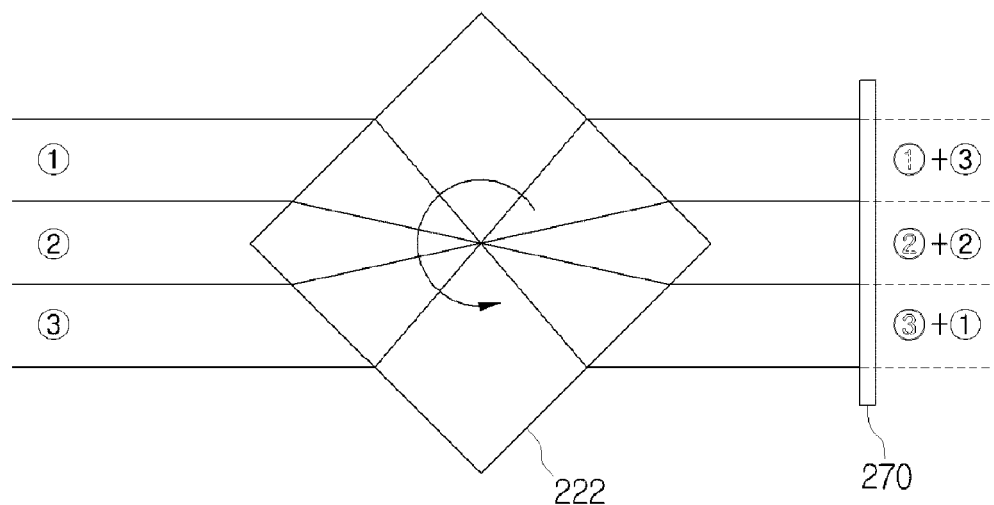

FIGS. 3A and 3B illustrate a case in which beams emitted from the illumination optical unit 210 enter the image display element 270 through the rotating prism 222. FIG. 3A is a drawing illustrating phases of beams entering the image display element 270 when the beams perpendicularly pass through the rotating prism 222 during rotating of the rotating prism 222. In FIG. 3A, beams enter the image display element 270 without being spatially shifted, similar to a case when the rotating prism 222 dose not exist. In contrast, when the rotating prism 222 rotates and beams enter the rotating prism with an incidence angle of 45 degrees, the positions of the beams are spatially shifted and enter the image display element 270, as shown in FIG. 3B. In other words, when the rotating prism 222 rotates, beams having different phases are irradiated onto the same area of the image display element 270 as time goes on, thereby reducing the speckle phenomenon.

Figure 4A:
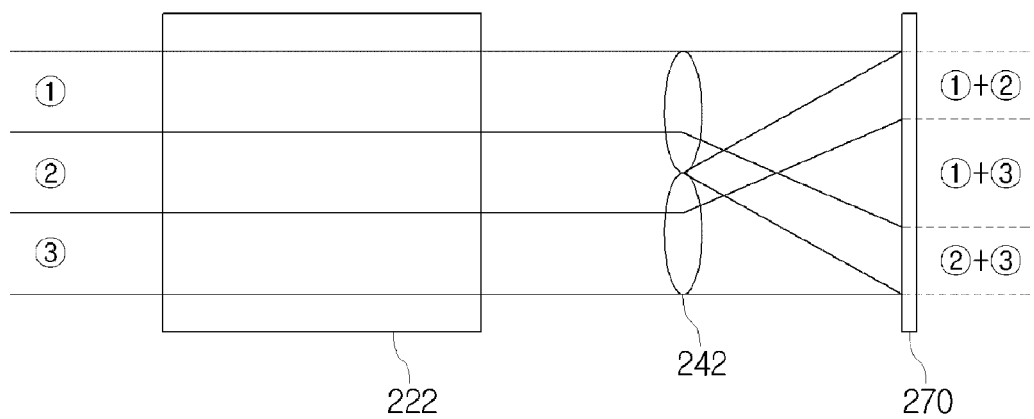
FIGS. 4A and 4B are drawings illustrating a case when beams emitted from an illumination optical unit enter an image display element through a rotating prism and a fly-eye lens array.
Figure 4B:
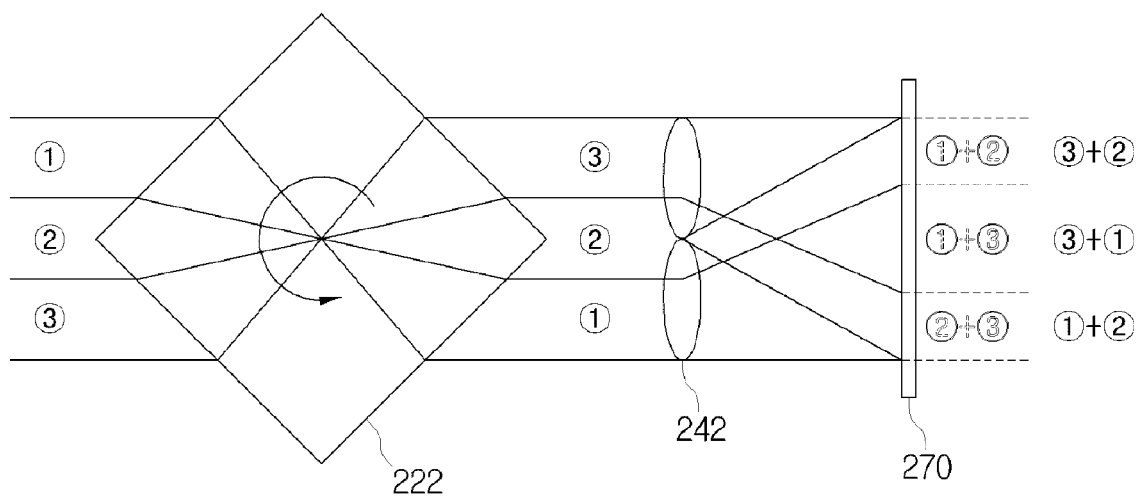

FIGS. 4A and 4B are drawings illustrating a case when beams emitted from the illumination optical unit 210 enter the image display element 270 through the rotating prism 222 and the fly-eye lens array 242. FIG. 4A is a drawing illustrating beams which perpendicularly pass through the rotating prism 222, pass through the fly-eye lens array 242, and enter the image display element 270. FIG. 4B is a drawing illustrating beams which enter the image display element 270 through the rotating prism 222 and the fly-eye lens array 242 when the rotating prism 222 is inclined at 45 degrees. As shown in FIG. 4B, the beams having temporally and spatially different phases are irradiated onto the image display element 270, thereby reducing the speckle phenomenon more than a case when only one of the rotating prism 222 and the fly-eye lens array 242 is used.

Figure 5A:
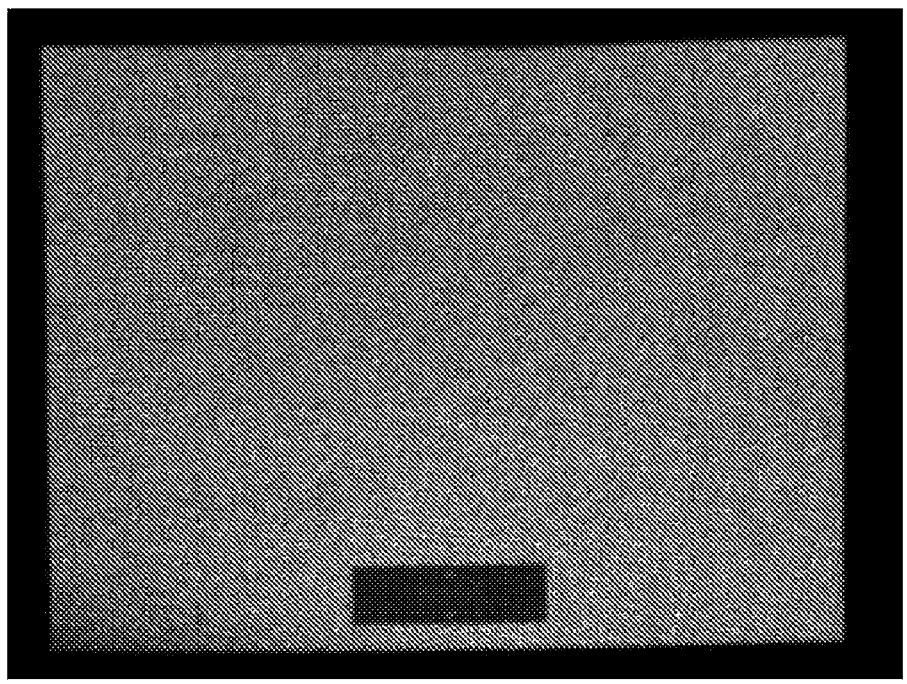
FIGS. 5A to 5C are drawings illustrating speckle patterns on a screen when a rotating prism and/or a fly-eye lens array is applied.
Figure 5B:
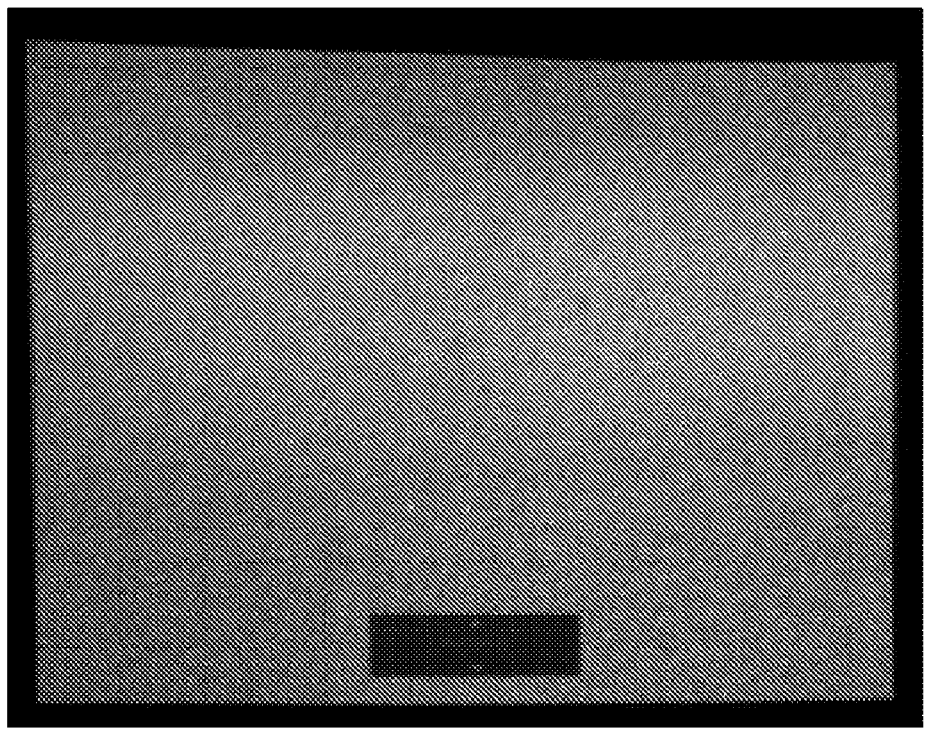
Figure 5C:
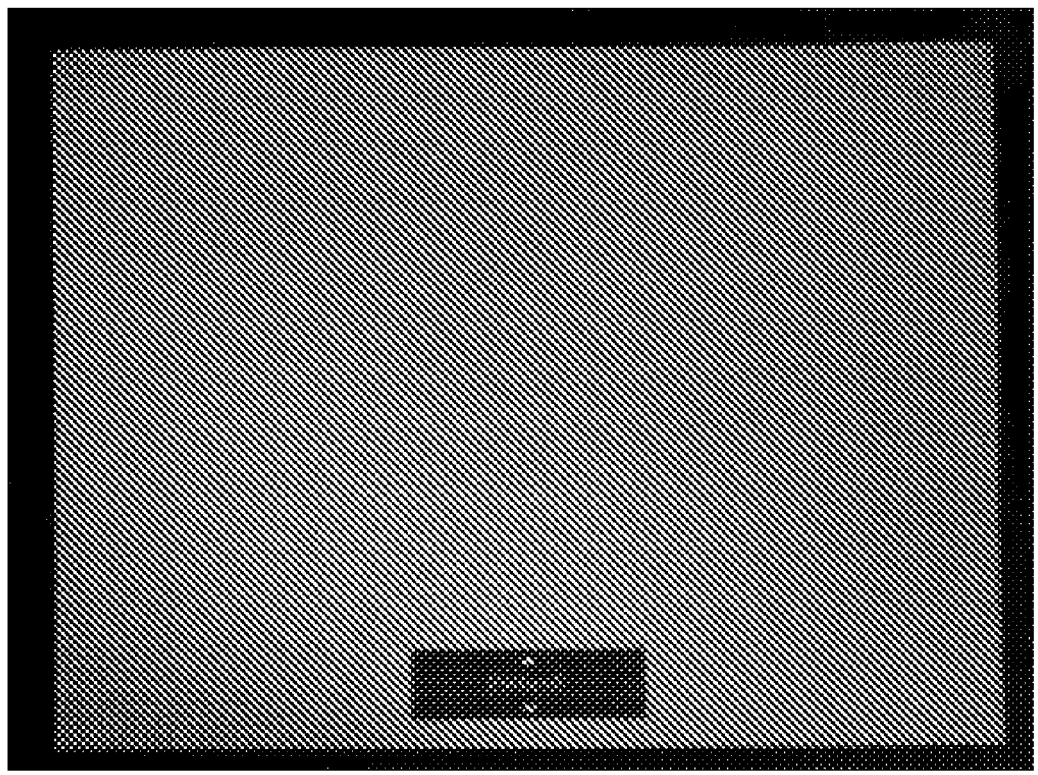

FIGS. 5A to 5C are drawings illustrating speckle patterns on the screen 290 when the rotating prism 222 and/or the fly-eye lens array 242 are applied.

FIG. 5A is a drawing illustrating a speckle pattern on the screen 290 when the fly-eye lens array 242 is applied and a contrast ratio is about 20%. FIG. 5B is a drawing illustrating a speckle pattern on the screen 290 when the rotating prism 222 is applied and a contrast ratio is about 12%. FIG. 5C is a drawing illustrating a speckle pattern when the rotating prism 222 and the fly-eye lens array 242 are applied and a contrast ratio is about 3.5% which is better than those in the cases when only one of the rotating prism 222 and the fly-eye lens array 242 is applied.

Figure 6:
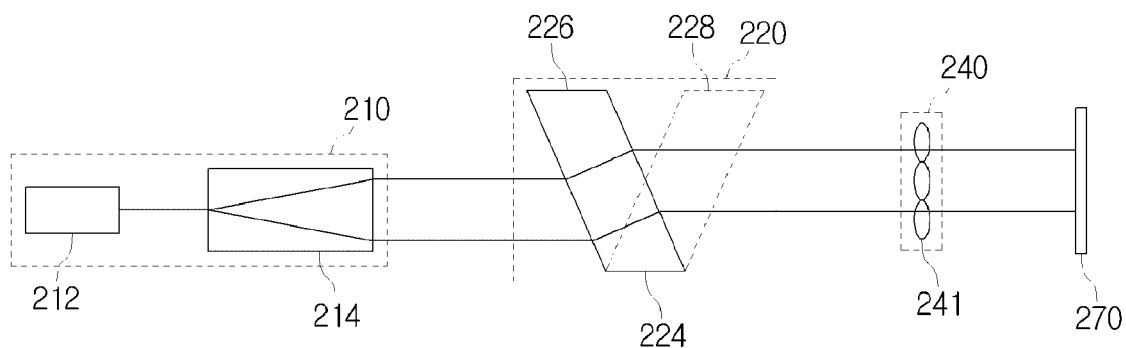
FIG. 6 is a block diagram illustrating a projection display apparatus according to another exemplary embodiment of the present invention.
Figure 7:
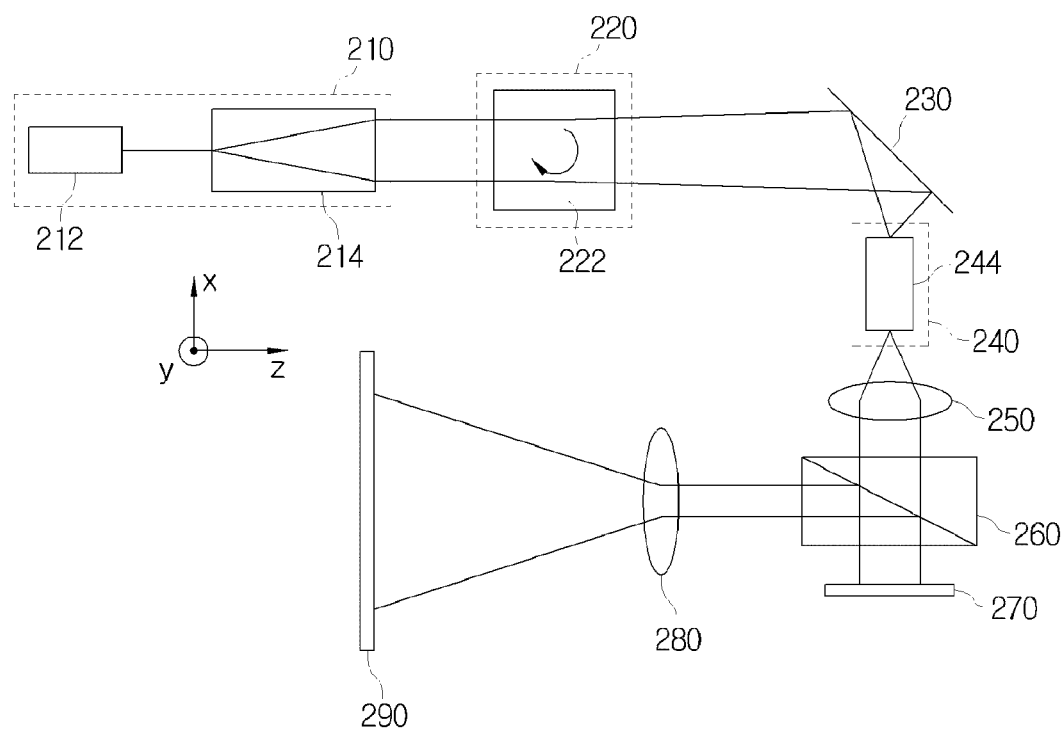
FIG. 7 is a block diagram of a projection display apparatus according to a further exemplary embodiment of the present invention.

FIG. 6 is a block diagram illustrating a projection display apparatus according to another exemplary embodiment of the present invention. As shown in FIG. 6, a projection display apparatus comprises a plate prism 224 as the spatial-beam changing unit 220 changing spatial positions of beams. The plate prism 224 periodically swings on an axis (X axis) perpendicular to the optical axis (Z axis, as shown in FIG. 7) between a first position 226 and a second position 228. Therefore, spatial positions of beams passing through the plate prism 224 are changed. The spatial-beam changing unit 220 is not limited to prisms rotating or swinging but may be composed of any prism capable of changing spatial positions of beams by movement as time goes on.

FIG. 7 is a block diagram of a projection display apparatus according to a further exemplary embodiment of the present invention. As shown in FIG. 7, a projection display apparatus comprises a light tunnel 244 as the uniform-beam distribution unit 240 uniformizing the distribution of light. The light tunnel 244 is formed of mirrors. Light passing through the light tunnel 244 is totally reflected by the mirrors. In other words, light passing through the light tunnel 244 is irregularly totally reflected inside the light source so as to be uniformly mixed. That is, the light tunnel 244 makes light be uniformly distributed in a specific space, similar to the fly-eye lens array 242.

As described above, since the spatial-beam changing unit 220 changing spatial positions of beams and the uniform-beam distribution unit 240 making light be uniformly distributed are used, it is possible to reduce speckles due to coherence of beams. Further, since a moving prism is used as the spatial-beam changing unit 220, it is possible to minimize light loss. Furthermore, since an additional device for reducing speckles is not necessary, it is possible to reduce the cost.

In this embodiment, the cases when the method of reducing a speckle phenomenon is applied to laser beams have been described. However, the method of reducing a speckle phenomenon can be applied to any coherent beams temporally and spatially maintaining the same phases.

Next, a method of scrolling beams on the image display element while reducing a speckle phenomenon of beams by using the spatial-beam changing unit and the uniform-beam distribution unit will be described.

FIG. 8 is a block diagram illustrating a projection display apparatus according to a still further exemplary embodiment of the present invention. As shown in FIG. 8, a projection display apparatus comprises an illumination optical unit 810 for irradiating a plurality of parallel beams, a scroll optical unit 830 for changing positions of beams to predetermined positions and scrolling the beams on an image display element 860 to be described later, a second relay lens unit 850 for irradiating beams emitted from the scroll optical unit 830 to the image display element 860, and the image display element 860.

The illumination optical unit 810 comprises light sources 811, 812, and 813 emitting red, green, and blue beams, respectively, and beam expanders 816, 817, and 818 expanding the red, green, and blue beams, respectively, to form beams. LEDs (light emitting diodes), lasers, and so on may be used as the light sources 811, 812, and 813.

Diffraction optical elements may be used as the beam expanders 816, 817, and 818. However, the beam expanders are not limited thereto. Any elements capable of expanding beams to form beams having predetermined widths may be used as the beam expanders.

The beams emitted from the beam expanders 816, 817, and 818 may be parallel emitted so as not to be overlapped. In this embodiment, a case when the beams are emitted in a third direction (Z-axis direction) and are parallel to one another in a first direction (X-axis direction) will be described.

The beam expanders 816, 817, and 818 may expand beams to form two-dimensional beams having predetermined sizes in a surface (XY plane) perpendicular to the propagation direction (Z-axis direction) of beams. Further, when each of the beams enters a first fly-eye lens array 842, a horizontal (Y directional) length of the beam in a light receiving surface of the first fly-eye lens array 842 may be larger than a horizontal (Y directional) length of a cell lens of the first fly-eye lens array 842 and a vertical (X directional) length of the beam in the light receiving surface of the first fly-eye lens array 842 may be one-third of a vertical (X directional) length of a cell lens.

The scroll optical unit 830 comprises the spatial-beam changing unit 820 changing positions of beams in paths of the beams without changing propagation directions of the beams and a first relay lens unit 840 uniformly scrolling the beams whose positions has been changed.

The spatial-beam changing unit 820 may be an inclined plate prism. An inclined prism means a prism inclined at a predetermined angle θ with respect to a surface (XY plane) perpendicular to a propagation direction (Z-axis direction) at a time point when the prism starts to rotate. As the spatial-beam changing unit 820 rotates around an axis parallel to the optical axis, positions of beams passing through the spatial-beam changing unit 820 are changed according to how the spatial-beam changing unit 820 rotates.

The spatial-beam changing unit 820 is flat and has a light receiving surface and a light emitting surface which are parallel. The spatial-beam changing unit 820 may be cylindrical or hexahedral. Therefore, light transmittance is constant as compared to a rotating prism through which beams pass along edges, which makes it possible to enhance light utilization efficiency.

The spatial-beam changing unit 820 is not limited to prisms but may be formed of any material capable of changing positions of beams. Further, beams whose positions have been changed by the spatial-beam changing unit 820 have changing positions at the light receiving surface of the first fly-eye lens array 842, which will be described in detail later.

The first relay lens unit 840 uniformly scrolls beams emitted from the spatial-beam changing unit 820 on the image display element 860. While the first relay lens unit 840 makes the beams be uniformly distributed, the beams are scrolled on the image display element 860. In particular, when the spatial-beam changing unit 820 changes the spatial positions of the beams as time goes on and makes the beams be uniformly distributed, the beams are scrolled. For ease of explanation, a description will be made as the first relay lens unit scrolls beams.

The first relay lens unit 840 may be composed of one fly-eye lens array or a plurality of fly-eye lens arrays. In this embodiment, a case when the first relay lens unit is composed of two fly-eye lens arrays 842 and 844 will be described. A fly-eye lens array is a lens array of small cell lens arranged two-dimensionally and beams passing through a fly-eye lens array are uniformly irradiated onto the image display element 860. In this embodiment, a fly-eye lens array composed of a 2 by 4 cell lens array will be described as an example. In particular, two cell lens are arranged every row in a first direction (X-axis direction) and four cell lens are arranged every column in a second direction (Y-axis direction).

The second relay lens unit 850 irradiates beams emitted from the scroll optical unit 830 to the image display element 860. In particular, the second relay lens unit 850 comprises a fly-eye lens 852 making beams emitted from the first relay lens unit 840 correspond to the entire area of the image display element 860 and a field lens 854 modulating the beams passed through the fly-eye lens 852 into parallel beams and irradiating the parallel beams to the image display element 860. However, the second relay lens unit 850 is not limited to the structure composed of the fly-eye lens 852 and the field lens 854. The second relay lens unit 850 may be composed of one or more spherical lens or aspheric lens making beams be condensed to the image display element 860.

The image display element 860 modulates the beams emitted from the second relay lens unit 850 according to image information. In particular, a plurality of blanking lines (not shown) for data addressing are formed in the image display element 860. Each blanking line uses scrolled beams to perform color data addressing, which will be described later.

Next, positions where beams emitted from the illumination optical unit 810 enter the first fly-eye lens array 842 according to how the inclined prism rotates will be described. FIGS. 9A to 9F are drawings illustrating the positions of the beams on the light receiving surface of the first fly-eye lens array 842 according to how the inclined prism rotates in reference to the second direction (Y-axis direction).

It is assumed that the inclined prism inclined at a predetermined angle with respect to the plane (XY plane) perpendicular to the paths of the beams rotates at a constant speed around an axis which passes through the center of the inclined prism and is parallel to the propagation direction of the beams.

Figure 9A:
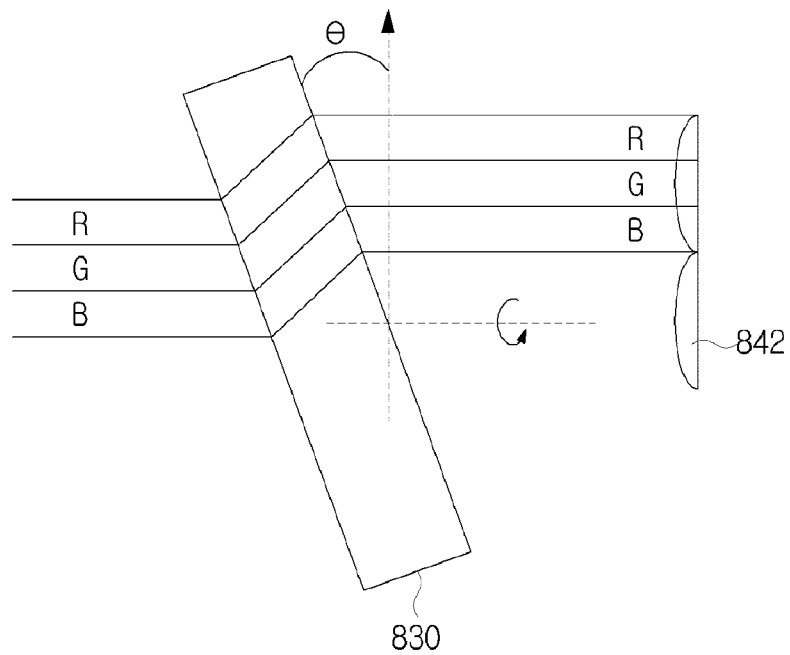
FIGS. 9A to 9F are drawings illustrating the positions of beams on a light receiving surface of a first fly-eye lens array depending on a rotation of an inclined prism.
Figure 9B:
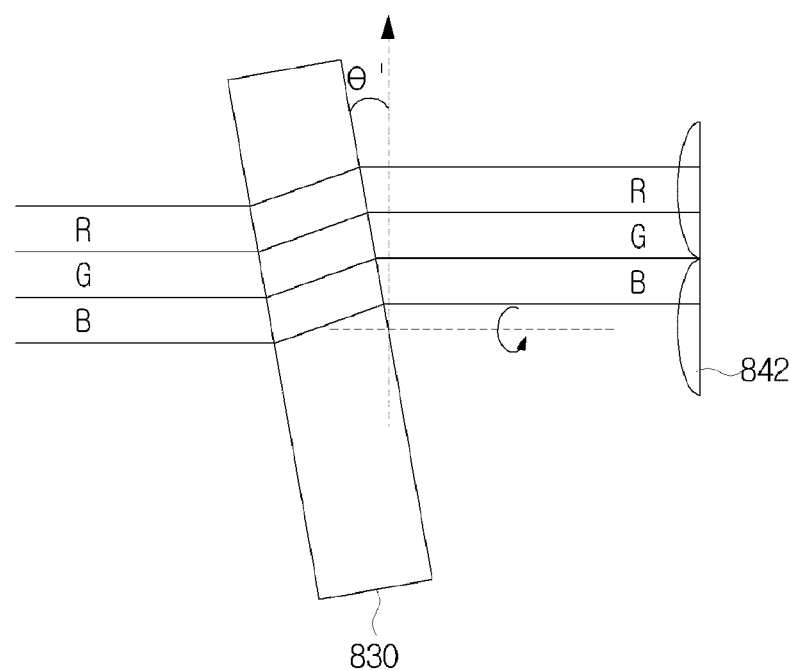
Figure 9C:
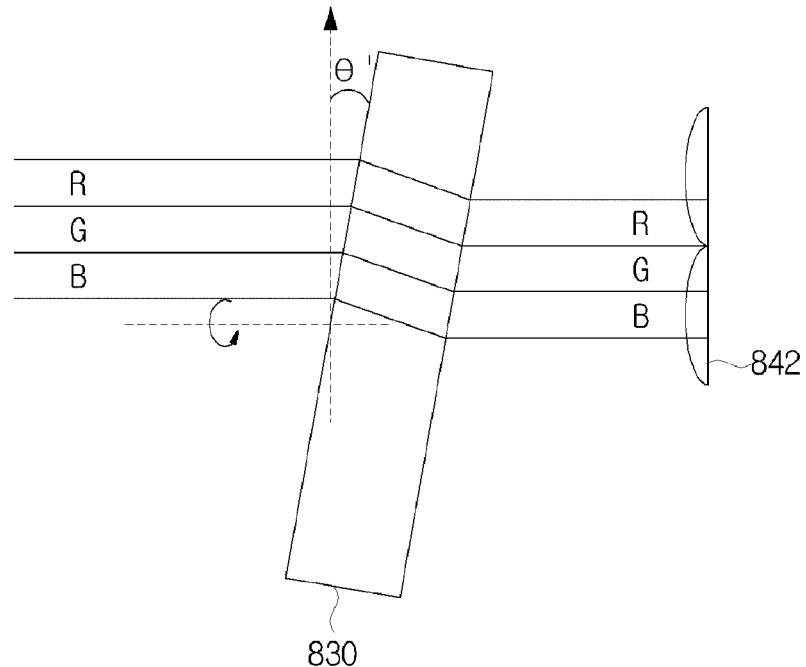
Figure 9D:
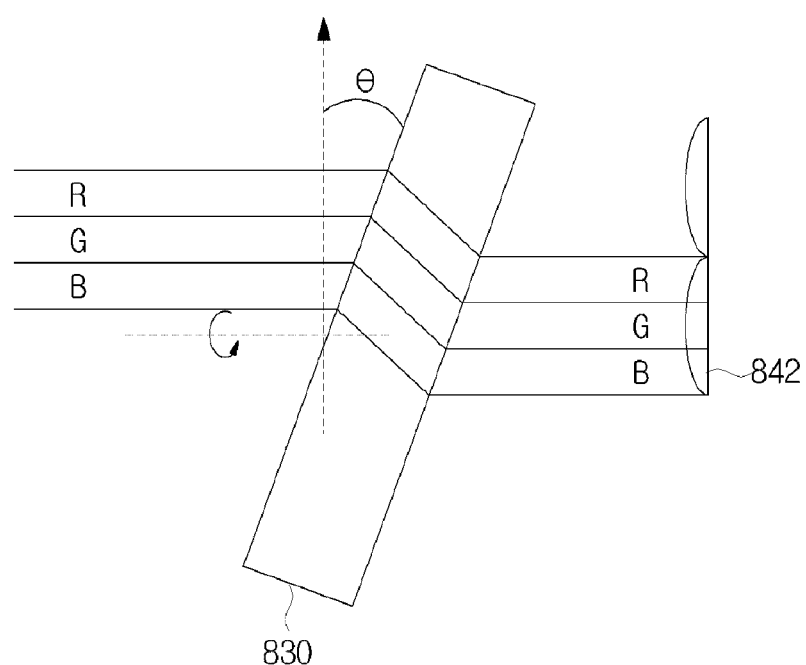
Figure 9E:
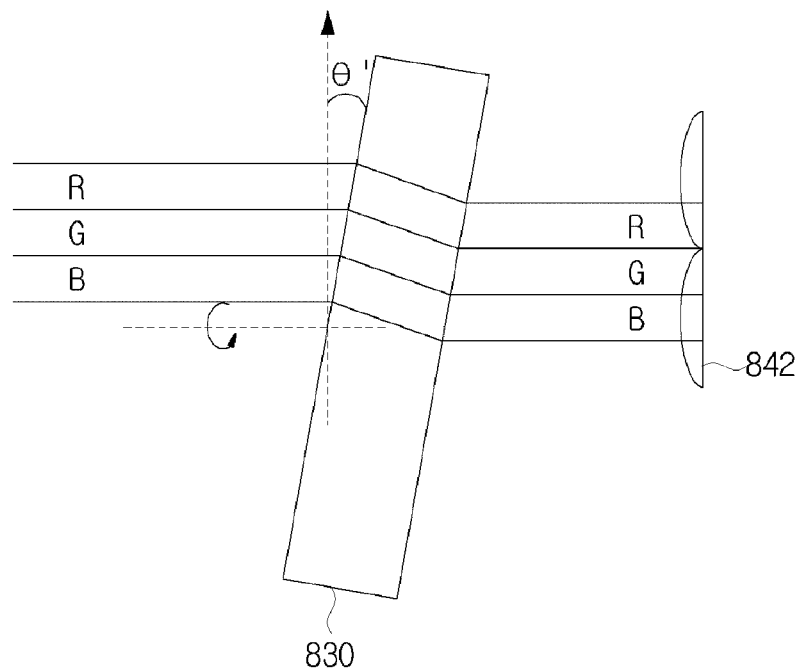
Figure 9F:
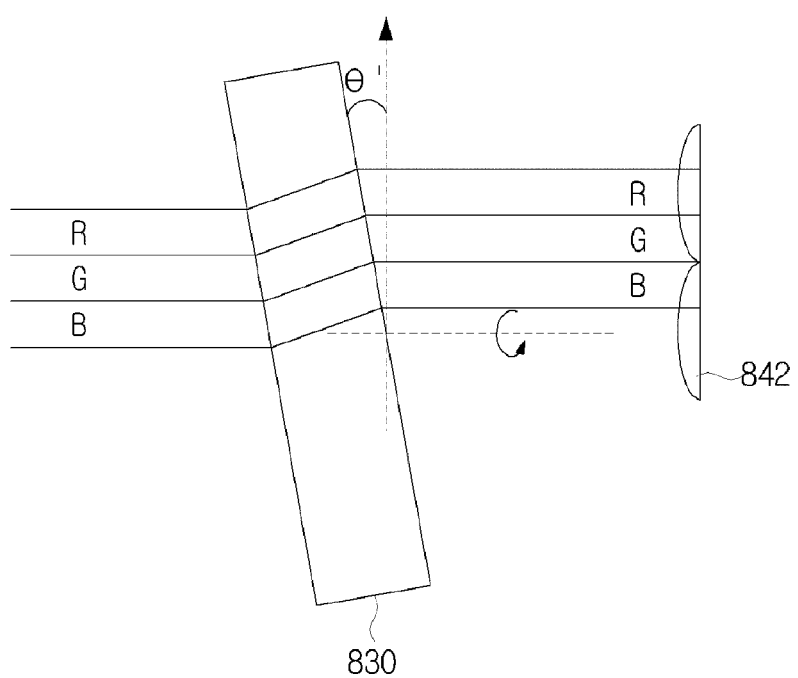

When the inclined prism starts to rotate, positions of beams passed through the inclined prism are changed on the light receiving surface of the first fly-eye lens array 842 in the first direction (X-axis direction) as shown in FIG. 9A and the beams enter upper cell lens, which are positioned over beam incidence positions on the light receiving surface of the first fly-eye lens array 842 when the beams emitted form the illumination optical unit 810 are directly irradiated to the first fly-eye lens array 842, of the cell lens constituting the first fly-eye lens array 842.

Then, if the inclined prism rotates 60 degrees, positions of beams passed through the inclined prism are changed on the light receiving surface of the first fly-eye lens array 842. However, a change in this case is less than the case when the inclined prism starts to rotate. Therefore, the beams passed through inclined prism enter cell lenses, which are positioned below the incidence positions of beams on the light receiving surface of the first relay lens unit 840 when the inclined prism starts to rotate and over the beam incidence positions on the light receiving surface of the first fly-eye lens array 842 when the beams emitted form the illumination optical unit 810 are directly irradiated to the first fly-eye lens array 842. Further, the incidence positions of the beams on the light receiving surface of the first fly-eye lens array 842 also are changed in the second direction (Y-axis direction) as the inclined prism rotates, which is not shown. That is, the incidence positions of the beams on the light receiving surface of the first fly-eye lens array 842 are changed in the first direction (X-axis direction) and the second direction (Y-axis direction).

If the inclined prism rotates 120 degrees, the incidence positions of the beams passed through the inclined prism are changed in a direction opposite to the first direction (X-direction) and the second direction (Y-axis direction). In this case, a change in the incidence positions in the direction opposite to the first direction (X-axis direction) correspond to the change in the incidence position in the first direction (X-axis direction) when the inclined prism rotates 60 degrees, and a change in the incidence positions in the second direction (Y-axis direction) is the same as the change in the incidence positions in the second direction (Y-axis direction) when the inclined prism rotates 60 degrees.

If the inclined prism rotates 180 degrees, the incidence positions of the beam on the light receiving surface of the first fly-eye lens array 842 are changed in only the direction opposite to the first direction (X-axis direction). A change in the incidence positions in the direction opposite to the first direction (X-axis direction) corresponds to the change in the incidence positions in the first direction (X-axis direction) when the inclined prism starts to rotate.

As described above, if the inclined prism rotates, the incidence positions of the beams passed through the inclined prism on the light receiving surface of the first fly-eye lens array 842 are changed in the first direction or the direction opposite to the first direction and the second direction or the direction opposite to the second direction.

FIGS. 10A to 10F are drawings illustrating the incidence positions of the beams on the light receiving surface (XY plane) of the first fly-eye lens array 842 as the inclined prism rotates by 60 degrees to make one rotation.

Figure 10A:
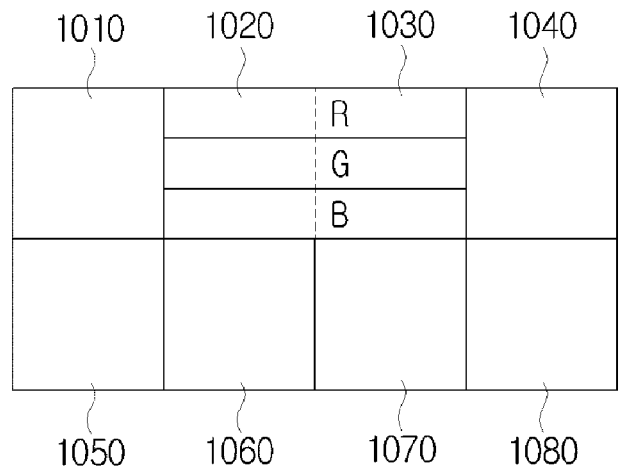
FIGS. 10A to 10F are drawings illustrating incidence positions of beams on a light receiving surface (XY plane) of a first fly-eye lens array as an inclined prism rotates by increments of 60 degrees to make one rotation.
Figure 10B:
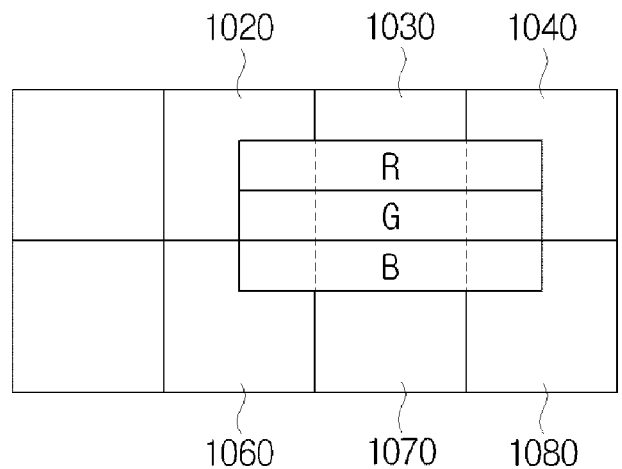
Figure 10C:
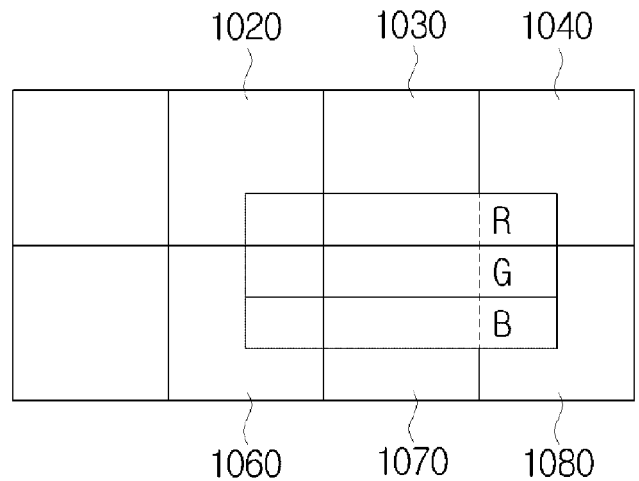
Figure 10D:
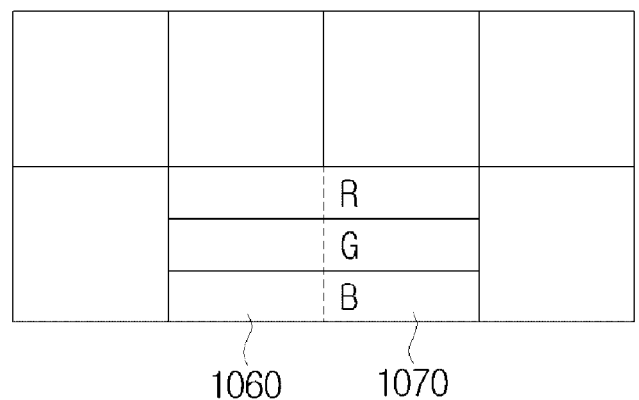
Figure 10E:
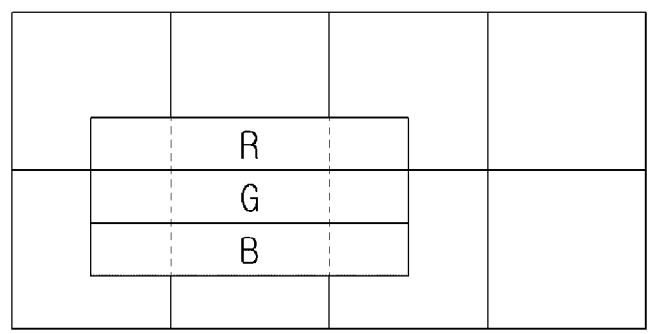
Figure 10F:
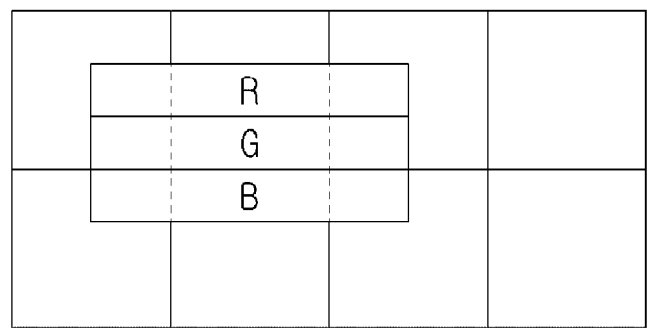

As shown in FIG. 10A, before the inclined prism rotates, the beam passed through the inclined prism are irradiated to a second cell lens 1020 and a third cell lens 1030 of the first fly-eye lens array 842 in the order of red, green, and blue beams. If the inclined prism rotates 60 degrees, the incidence positions of the beams passed through the inclined beams are changed in the first direction (X-axis direction) and a change in the incidence positions is less than that when the inclined prism starts to rotate. Further, if the inclined prism rotates 60 degrees, the incidence positions of the beams passed through the inclined prism also are changed in the second direction (Y-axis direction). Therefore, when the inclined prism rotates 60 degrees, the beams passed through the inclined prism enters the second to fourth cell lenses 1020, 1030, and 1040, and sixth to eighth cell lenses 1060, 1070, and 1080. In particular, red beams enter the middle portions of the second to fourth cell lenses 1020, 1030, and 1040, green beams enter the lower portions of the second to fourth cell lenses 1020, 1030, and 1040, and the blue beams enter the upper portions of the sixth to eighth cell lenses 1060, 1070, and 1080.

As described above, the incidence positions of the beams on the first fly-eye lens array 842 varies as the inclined prism rotates. In this embodiment, the incidence positions of the beams on the first fly-eye lens array 842 when the inclined prism rotates by 60 degrees are shown in the drawings. However, since the inclined prism rotates continuously, the incidence positions of the beam on the first fly-eye lens array 842 varies continuously.

In order that the beams emitted from the illumination optical unit 810 are irradiated to the first fly-eye lens array 842 as shown FIGS. 10A to 10F, the positions of the illumination optical unit 810, the spatial-beam changing unit 820, and the fly-eye lens array should be adjusted in advance.

Next, a case when beams passing through the first relay lens unit 840 and the second relay lens unit 850 are irradiated onto the image display element 860 will be described. FIGS. 11A to 11F are drawings illustrating beams irradiated onto the image display element 860 during one rotation of the inclined prism when the inclined prism rotates by 60 degrees. The beams irradiated onto the first fly-eye lens array 842 are irradiated onto the image display element through the second fly-eye lens array 844 and the second relay lens unit 850.

Figure 11A:
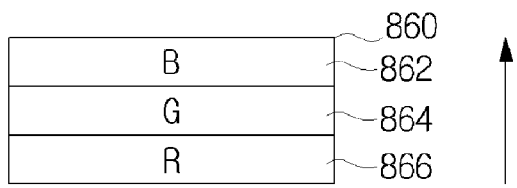
FIGS. 11A to 11F are drawings illustrating beams irradiated onto an image display element during one rotation of an inclined prism when the inclined prism rotates by increments of 60 degrees.
Figure 11B:
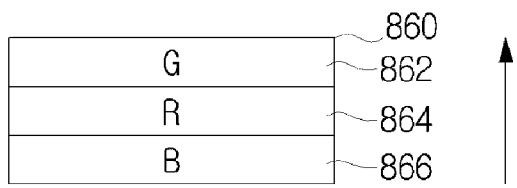
Figure 11C:
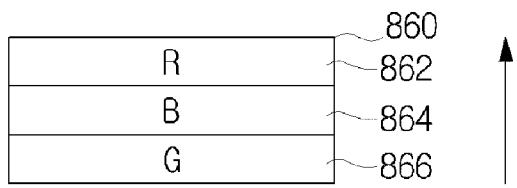
Figure 11D:
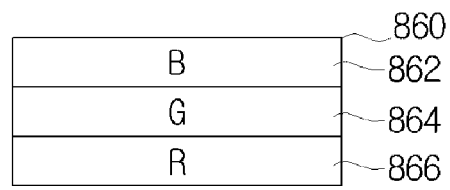
Figure 11E:
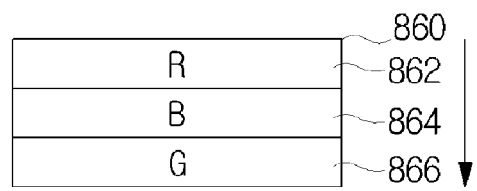
Figure 11F:
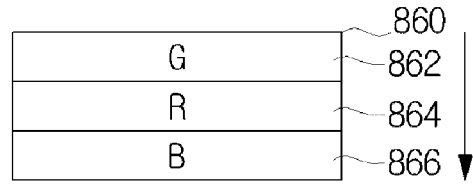

The beams emitted from the light source 812 are inverted and irradiated onto the image display element 860 through the first relay lens unit 840 and the second relay lens unit 850. In particular, when the inclined prism starts to rotate, blue, green, and red beams are irradiated from the top in that order onto the image display element 860 as shown in FIG. 11A. If the inclined prism rotates 60 degrees, green, red, and blue beams are irradiated onto the image display element 860 in that order as shown in FIG. 11B. If the inclined prism rotates 120 degrees, red, blue, and green beams are irradiated onto the image display element 860 in that order shown in FIG. 11C. If the inclined prism rotates 180 degrees, blue, green, and red beams are irradiated onto the image display element 860 in that order as shown in FIG. 11D. In this way, the beams irradiated onto the image display element 860 while the inclined prism rotates 180 degrees are scrolled downward.

Further, if the inclined prism rotates 240 degrees, red, blue, and green beams are irradiated onto the image display element 860 in that order, and if the inclined prism rotates 300 degrees, blue, green, and red beams are irradiated onto the image display element 860 in that order. If the inclined prism rotates 360 degrees, blue, green, and red beams are irradiated onto the image display element 860 in the same order as that when the inclined prism starts to rotate. In this way, the beams irradiated onto the image display element 860 while the inclined prism rotates from 180 degrees to 360 degrees are scrolled upward.

As described above, the positions of the beams irradiated onto the first fly-eye lens array 842 are changed as the prism rotates, whereby the beams irradiated onto the image display element 860 are scrolled. Therefore, all the red, green, and blue beams are irradiated onto the image display element 860 during the same time period, which enhances light utilization efficiency as compared to an apparatus for sequentially emitting beams using a color wheel.

Meanwhile, the plurality of blanking lines (not shown) of the image display element 860 perform data addressing corresponding to the scrolling direction of the beams. In other words, when the inclined prism starts to rotate, blacking lines in a first area 862 of the image display element 860 perform blue data addressing, blanking lines in a second area 864 perform green data addressing, and blanking lines in a third area 866 perform red data addressing. If the inclined prism rotates 60 degrees, the blacking lines in the first area 862 perform green data addressing, the blanking lines in the second area 864 perform red data addressing, and the blanking lines in the third area 866 perform blue data addressing.

In that way, while the inclined prism rotates to 180 degrees, the blacking lines in the first area 862 perform addressing in the order of blue, green, and red data, the blanking lines in the second area 864 perform addressing in the order of green, red, and blue data, and the blanking lines in the third area 866 perform addressing red, blue, and green data. In other words, while the inclined prism rotates to 180 degrees, the blanking lines perform red data addressing upward. In contrast, while the inclined prism rotates from 180 degrees to 360 degrees, the blanking lines perform red data addressing downward.

That is, while the beams are scrolled downward, the blanking lines perform optical data addressing upward, and while the beams are scrolled upward, the blanking lines perform the optical data addressing downward. While the addressing is performed, the image display element 860 modulates the beams to form an image.

Figure 12:
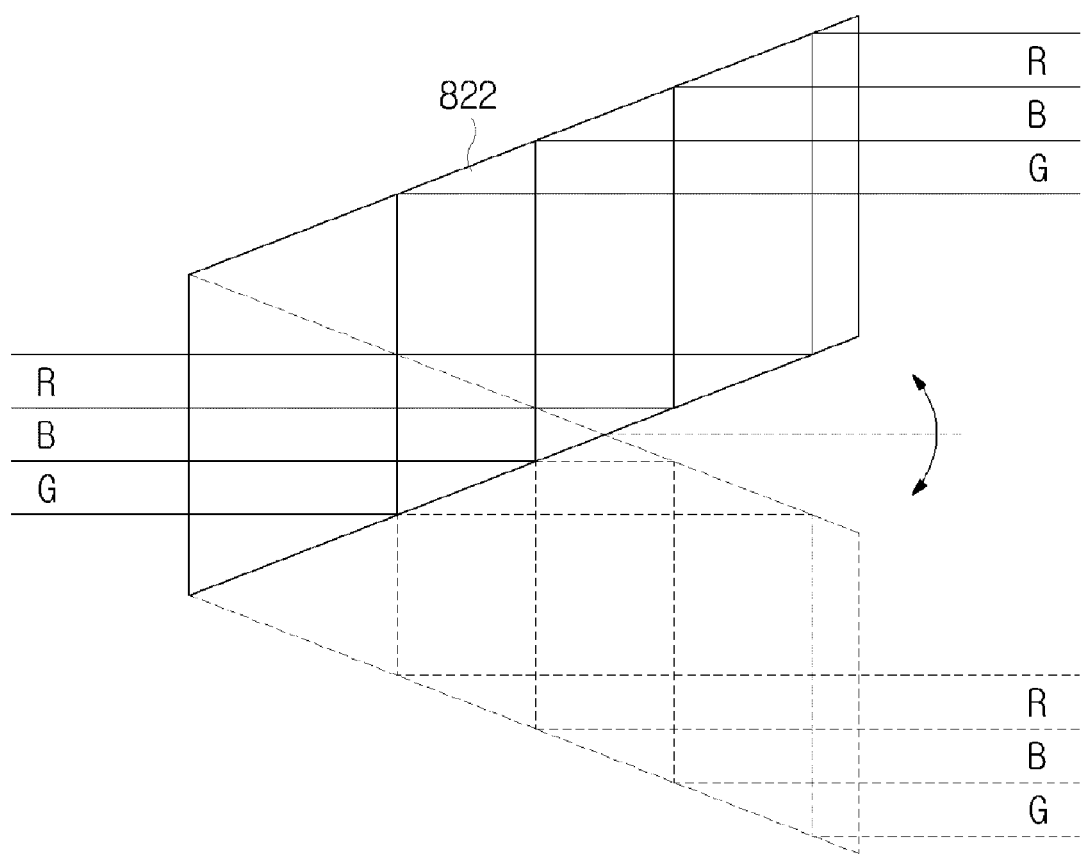
FIGS. 12 and 13 are drawings illustrating other examples of a spatial-beam changing unit capable of being applied to the exemplary embodiments of the present invention.
Figure 13:
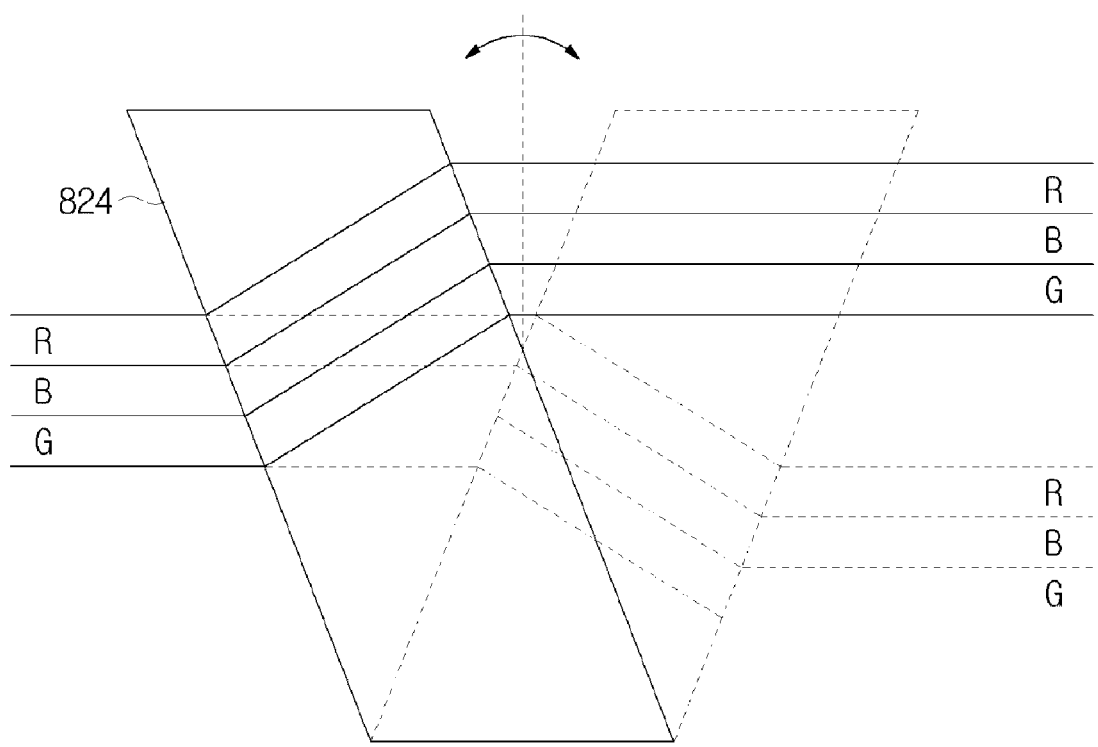

FIGS. 12 and 13 are drawings illustrating other examples of the spatial-beam changing unit 820 capable of being applied to the exemplary embodiments of the present invention.

As shown in FIG. 12, the spatial-beam changing unit 820 may be composed of an inclined prism 822, which has a light receiving surface and a light emitting surface perpendicular to the paths of the beams and whose top and bottom surfaces are parallel and totally reflect incident beams. Therefore, the positions of beams passing through the spatial-beam changing unit 820 shown in FIG. 12 are changed to predetermined positions without a change in the propagation direction of the beams, and are emitted. In particular, when the spatial-beam changing unit 820 rotates around an axis perpendicular to the optical axis, a change in the positions of the beams emitted from the spatial-beam changing unit 820 varies. Therefore, the positions of the beams on the light receiving surface of the first fly-eye lens array 842 vary as the spatial-beam changing unit 820 rotates.

As shown in FIG. 13, the spatial-beam changing unit 820 may be composed of an inclined prism 824 which swings on an axis perpendicular to the propagation direction of the beams and passing through the center of the inclined prism. If the spatial-beam changing unit 820 shown in FIG. 13 is used, the positions of the beams are changed in the first direction (X-axis direction) and the direction opposite to the first direction (X-axis direction), which it possible to use a fly-eye lens smaller than the first fly-eye lens 842 shown in FIG. 8.

As described above, according to the present invention, the spatial-beam changing unit changing the spatial positions of the beams and the uniform-beam distribution unit making the beams be uniformly distributed are used. Therefore, it is possible to reduce the speckle phenomenon and to enhance the light utilization efficiency when the plurality of beams are scrolled.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A projection display apparatus comprising:
    an illumination optical unit which emits beams;
    an image display element which modulates the beams incident thereon according to image information;
    a spatial-beam changing unit which changes spatial positions of the beams emitted from the illumination optical unit; and
    a uniform-beam distribution unit, disposed between the spatial-beam changing unit and the image display element, which uniformly distributes the beams incident thereon,
    wherein the spatial-beam changing unit comprises a moveable prism the movement of which changes the spatial positions of beams emitted therefrom.

2. The apparatus as claimed in claim 1, wherein the uniform-beam distribution unit changes the spatial positions of the beams incident thereon.

3. The apparatus as claimed in claim 2, wherein the prism has a light receiving surface and a light emitting surface parallel to each other.

4. The apparatus as claimed in claim 2, wherein the prism swings on an axis perpendicular to an optical axis of the beams.

5. The apparatus as claimed in claim 2, wherein the uniform-beam distribution unit is a fly-eye lens array comprising a plurality of cell lenses.

6. The apparatus as claimed in claim 2, wherein the uniform-beam distribution unit is a light tunnel composed of a plurality of mirrors.

7. The apparatus as claimed in claim 1, wherein:
    the uniform-beam distribution unit comprises a relay lens unit scrolling the plurality of beams whose spatial positions have been changed by the spatial-beam changing unit,
    wherein the illumination optical unit emits a plurality of parallel beams of different colors.

8. The apparatus as claimed in claim 7, wherein the relay lens unit scrolls the beams to be irradiated onto the image display element according to incidence positions of the beams on the relay lens unit.

9. The apparatus as claimed in claim 8, wherein a scrolling direction of the beams irradiated onto the image display element is inverted at least one time during one period of movement of the spatial-beam changing unit.

10. The apparatus as claimed in claim 7, wherein the spatial-beam changing unit is substantially planar and has a light receiving surface and a light emitting surface parallel to each other.

11. The apparatus as claimed in claim 7, wherein the spatial-beam changing unit is an inclined prism inclined at a predetermined angle with respect to a plane containing an optical axis of the beams.

12. The apparatus as claimed in claim 11, wherein the spatial-beam changing unit rotates around an axis parallel to the optical axis.

13. The apparatus as claimed in claim 11, wherein the spatial-beam changing unit rotates around an axis perpendicular to the optical axis.

14. The apparatus as claimed in claim 11, wherein the spatial-beam changing unit swings on an axis perpendicular to the optical axis.

15. The apparatus as claimed in claim 7, wherein the relay lens unit comprises at least one fly-eye lens.

16. The apparatus as claimed in claim 2, wherein the prism rotates around an axis perpendicular to an optical axis of the beams.

* * * * *